US009413621B2

(12) United States Patent
Mukherjee et al.

(10) Patent No.: US 9,413,621 B2
(45) Date of Patent: *Aug. 9, 2016

(54) PEER-TO-PEER AD HOC NETWORK SYSTEM FOR MONITORING A PRESENCE OF MEMBERS OF A GROUP

(71) Applicant: GLOBALFOUNDRIES INC., Grand Cayman (KY)

(72) Inventors: Maharaj Mukherjee, Poughkeepsie, NY (US); Monimala Mukherjee, Poughkeepsie, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 49 days.

This patent is subject to a terminal disclaimer.

(21) Appl. No.: 13/936,496

(22) Filed: Jul. 8, 2013

(65) Prior Publication Data
US 2014/0362727 A1    Dec. 11, 2014

Related U.S. Application Data

(63) Continuation of application No. 13/910,594, filed on Jun. 5, 2013, now Pat. No. 9,300,555.

(51) Int. Cl.
*H04L 1/00* (2006.01)
*H04L 12/26* (2006.01)
*H04L 29/08* (2006.01)
*H04L 12/24* (2006.01)

(52) U.S. Cl.
CPC ............ *H04L 43/06* (2013.01); *H04L 67/1044* (2013.01); *H04L 67/18* (2013.01); *H04L 41/12* (2013.01)

(58) Field of Classification Search
USPC ......... 370/252, 312, 313, 328, 338, 345, 346, 370/449; 340/539.13, 539, 15, 539.32
See application file for complete search history.

(56) References Cited

U.S. PATENT DOCUMENTS 6,993,325 B1 *  1/2006  Waesterlid ................. 455/414.1
7,123,153 B2 * 10/2006  Thorstensen et al. ...... 340/573.3

(Continued)

FOREIGN PATENT DOCUMENTS

EP         2270622 A2    6/2004

OTHER PUBLICATIONS

Antoniou, et al, "User-Centered Design of a Secure P2P Personal and Social Netoworking Platform", In Proceedings of 3rd IASTED Internationall Conference on Human-Computer Interaction, Mar. 17-19, 2008, 6 pages.

(Continued)

*Primary Examiner* — Frank Duong
(74) *Attorney, Agent, or Firm* — Michael LeStrange; Andrew M. Calderon; Roberts Mlotkowski Safran Cole & Calderon, P.C.

(57) ABSTRACT

Embodiments include peer-to-peer ad hoc network having a group having a plurality of members, each of the plurality of members comprising a locating device, wherein the plurality of members are configured to detect an absence of one of the plurality of members from the group. The system also includes a location server configured to communicate with the locating device of at least one of the plurality of members and a supervisor device configured to receive an alert from the location server, wherein the alert is generated by the location server in response to a detection of the absence of one of the plurality of members from the group.

7 Claims, 4 Drawing Sheets

(56) References Cited

U.S. PATENT DOCUMENTS

| | | | |
|---|---|---|---|
| 2002/0151320 A1* | 10/2002 | Wasenius | 455/518 |
| 2005/0143096 A1* | 6/2005 | Boesch | 455/456.3 |
| 2005/0200487 A1* | 9/2005 | O'Donnell et al. | 340/573.1 |
| 2006/0248337 A1 | 11/2006 | Koodli | |
| 2007/0021137 A1* | 1/2007 | Kokkonen et al. | 455/518 |
| 2008/0146205 A1* | 6/2008 | Aaron | 455/414.2 |
| 2008/0219227 A1 | 9/2008 | Michaelis | |
| 2014/0300471 A1* | 10/2014 | Guo et al. | 340/539.32 |
| 2014/0347973 A1* | 11/2014 | Yu et al. | 370/216 |

OTHER PUBLICATIONS

Friedman, et al, "Peer to Peer Security", Telecommunications Policy Research Conference, Washington DC, Sep. 19-21, 2003; 11 pages.

Capkun, et al, "Integrity Regions: Authentication Through Presence in Wireless Networks", IEEE Transactions on Mobile Computing, Nov. 2010; vol. 9; Issue: 11, pp. 1608-1621.

* cited by examiner

PEER-TO-PEER AD HOC NETWORK SYSTEM FOR MONITORING A PRESENCE OF MEMBERS OF A GROUP

CROSS-REFERENCE TO RELATED APPLICATION

This application is a continuation of U.S. application Ser. No. 13/910,594 filed on Jun. 5, 2013, which is herein incorporated by reference in its entirety.

BACKGROUND

Exemplary embodiments relate to ad hoc networks, and more specifically, to methods and systems for providing a peer-to-peer ad hoc network for monitoring the presence of the members of a group.

In peer-to-peer computer networks, each computer in the network can act as a client or a server for the other computers in the network, allowing shared access to various resources such as files, peripherals, and sensors without the need for a central server. Peer-to-peer networks can be set up within a home, a business, or over the Internet and require all computers in the peer-to-peer network to use the same or a compatible program to connect to each other and access files and other resources found on the other computers. Currently, peer-to-peer networks are commonly used for sharing content such as audio, video, or data.

In general, an ad hoc network is a decentralized type of network that does not rely on a preexisting infrastructure, such as routers in wired networks or access points. Rather, each node participates in routing by forwarding data for other nodes, so the determination of which nodes forward data is made dynamically on the basis of network connectivity. In addition to the classic routing, ad hoc networks can use flooding for forwarding the data. An ad hoc network typically refers to any set of networks where all devices have equal status on a network and are free to associate with any other ad hoc network device in link range.

The safety of the children both inside and outside the home is a primary concern for the parents, guardians and supervisors of the children. Currently, there are a wide variety of applications that allow parents to track the location of their children. For example, many cellular telephone providers sell applications that allow parents to use cellular phone and/or global positioning system technologies to track the location of their children and to receive alerts when their child is outside of an allowed geographical space or if their child is not in an expected location at an expected time.

However, the currently available tracking technologies only allow the location of the child to be tracked and determined. The existing systems do not allow parents to determine if their children are with a known or trusted group of people at a specific time.

SUMMARY

According to an exemplary embodiment, a method for monitoring a presence of members of a group includes forming a peer-to-peer ad hoc network comprising one or more groups, each of the one or more groups comprising a plurality of members. The method also includes monitoring, by the plurality of members, a presence of each of the plurality of members in the group. Based on detecting a missing member of the one or more groups, generating, by a processor of one of the plurality of members, the method includes a notification of the missing member. The method further includes transmitting an alert to a supervisor corresponding to the missing member in response to the notification of the missing member.

According to a further exemplary embodiment, a computer program product for monitoring a presence of members of a group includes a computer readable storage medium having computer readable program code embodied therewith. The computer readable program code being configured to perform a method. The method includes forming a peer-to-peer ad hoc network comprising one or more groups, each of the one or more groups comprising a plurality of members. The method also includes monitoring, by the plurality of members, a presence of each of the plurality of members in the group. Based on detecting a missing member of the one or more groups, generating, by a processor of one of the plurality of members, the method includes a notification of the missing member. The method further includes transmitting an alert to a supervisor corresponding to the missing member in response to the notification of the missing member.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION

Exemplary embodiments of this disclosure include an ad hoc peer-to-peer network configured to monitor the presence of the members of a group. In exemplary embodiments, the group may be ad hoc in nature and may be created for a particular purpose. In addition, the group may only be active during the time the purpose is to be accomplished. The peer to peer network includes a set of members, each having a locating device that is configured to communicate with the other members. In exemplary embodiments, when a member of the group is outside a region formed the set of locating devices for a certain length of time an alert is created. In exemplary embodiments, the alert is communicated to one or more interested party that has been designated a supervisor of the missing member of the group.

Figure 1:
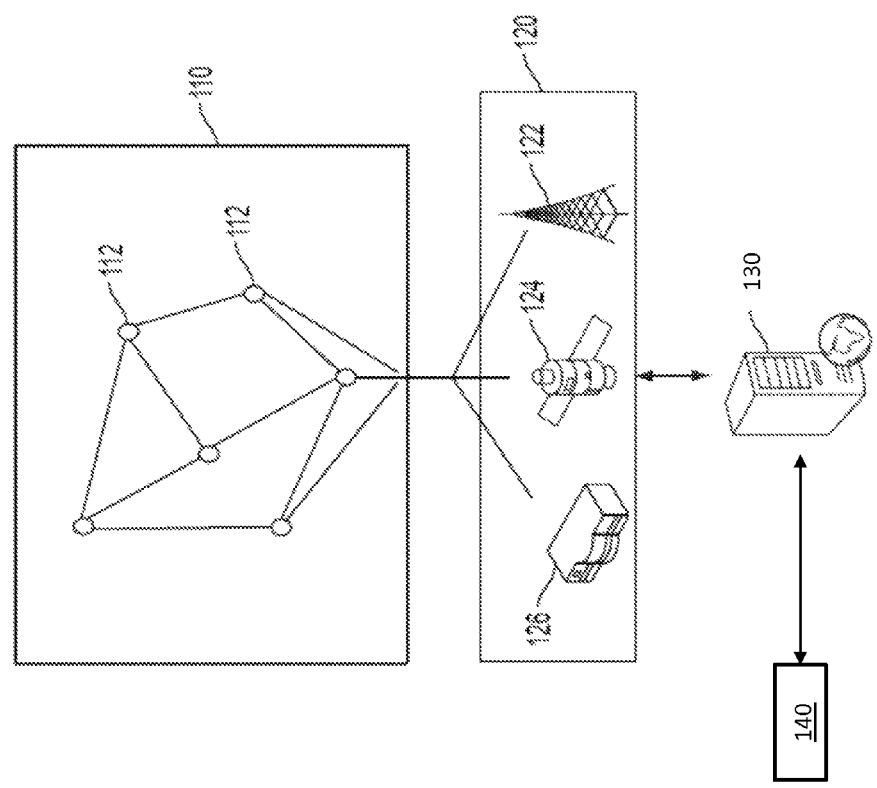
FIG. 1 is a schematic diagram of a peer-to-peer ad hoc network system for monitoring a presence of members of a group according to an exemplary embodiment.

Referring now to FIG. 1, a schematic diagram of a peer-to-peer ad hoc network system 100 for monitoring a presence of members of a group according to an exemplary embodiment is shown. As illustrated, the peer-to-peer ad hoc network system 100 includes a group 110 that has a plurality of members 112. In exemplary embodiments, each member 112 of the group 110 includes a locating device that is configured to communicate with the locating devices of the other members 112 of the group. In exemplary embodiments, one or more of the members 112 of the group 110 configured to communicate with a communications system 120. In exemplary embodiments, the communications system 120 may include one or more of a global positioning system 124, a cellular communications system 122, and a Wi-Fi communications system 126. The communications system 120 is configured to communicate with a location server 130, which in turn is configured to communicate with a supervisor device 140. In exemplary embodiments, the supervisor device 140 may be a cellular phone, a computer or any other suitable device.

In exemplary embodiments, the group 110 is ad hoc in nature is created for a particular purpose. The group 110 is only active during a time period specified for the purpose and is disbanded after the time period expires. During operation, the members 112 of the group 110 communicate with each other and are configured to ensure that all of the members 112 of the group 110 are present. Upon detecting that a member 112 of the group 110 is not present for a certain length of time, one or more members 112 of the group 110 communicates to the location server 130, via the communications network 120, the absence of the member 112 of the group 110. In exemplary embodiments, the communication that a member 112 of the group 110 is missing may be sent from any of the members 112 of the group 110, including the missing member 112. Upon receiving the notification that a member 112 of the group 110 is missing, the location server 130 sends an alert to one or more supervisor devices 140 that corresponds to the missing member 112. In exemplary embodiments, the alert may be a text message, a phone call, an email, or any other suitable form of communication. In exemplary embodiments, the alert may include, but is not limited to, the identity of the missing member, the group the member is missing from, the last known location of the member, the last known group the member was a part of, a current location of the member, or the like.

Figure 2:
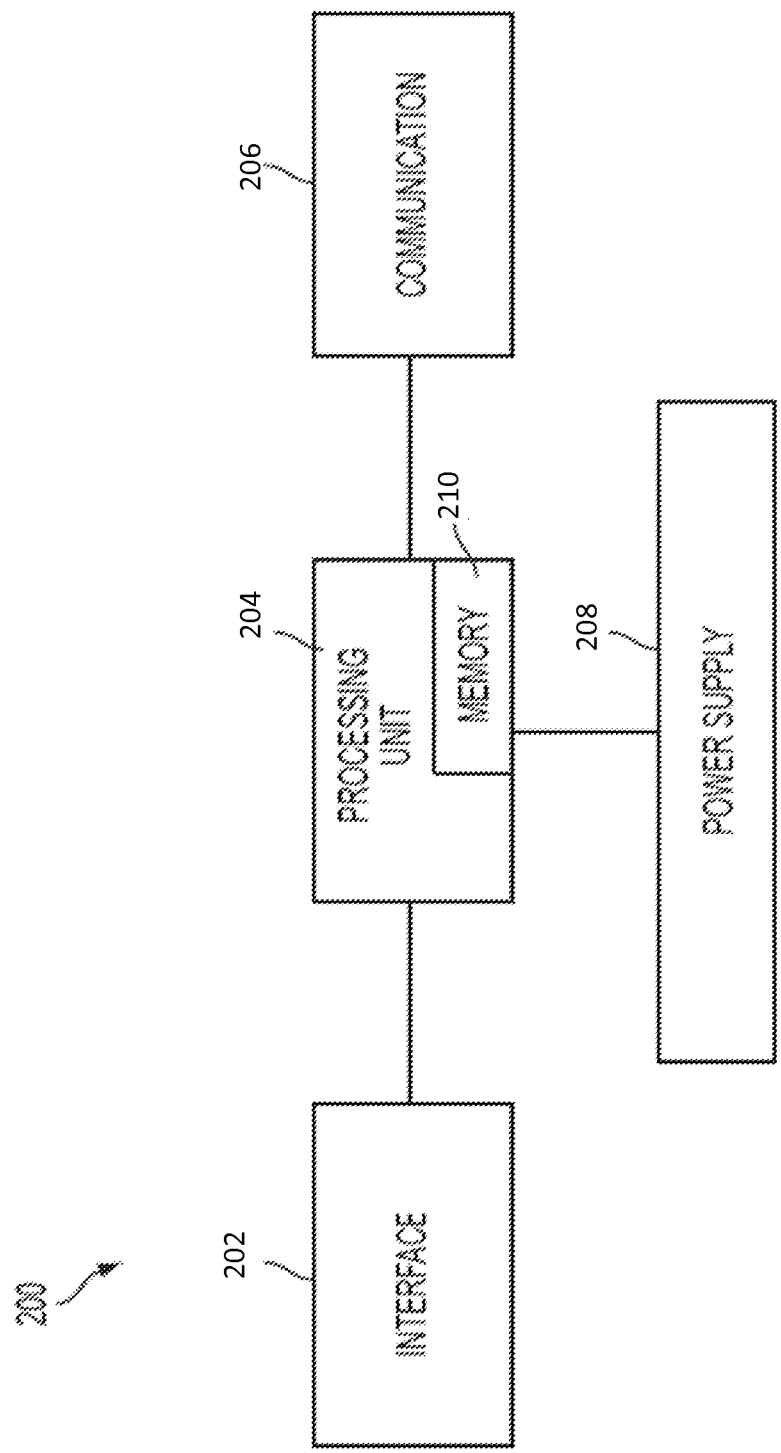
FIG. 2 is a block diagram of a locating device according to an exemplary embodiment.

Referring now to FIG. 2, a block diagram of a locating device 200 according to an exemplary embodiment is shown. As illustrated, the locating device 200 includes an interface 202, a processing unit 204, a communications device 206, and a power supply 208. In exemplary embodiments, the interface 202 may be used to configure the operation of the locating device 200. The interface 202 may include a physical user interface, such as a touch screen or the like, or software based user interface that allows configuration of the locating device via a computer program or webpage. The interface 202 may include, but is not limited to, I2C, SPI, analog I/O, digital I/O, and serial communication RS-232.

In exemplary embodiments, the communications device 206 may include, but is not limited to, one or more of a cellular communications device, a Bluetooth communications device, a Wi-Fi communications device, or the like. In exemplary embodiments, the communications device 206 is configured to communicate with one or more other communications devices 206 that are within a predetermined proximity. In addition, the communications device 206 may be configured to communicate with a communications network, as described above with reference to FIG. 1. In exemplary embodiments, the processing unit 204 may include any suitable processor and memory device 210. The power supply 208 may include batteries, a line power adapter, and/or an energy harvesting device. Energy harvesting devices may include solar panel capable of being powered by indoor lighting (or energy harvesting by vibration or radio frequency signals). In exemplary embodiments, the modularity of the locating device 200 allows the locating device 200 to have different kinds of power supplies 208 in order to be able to adapt to the requirements of the various applications.

In exemplary embodiments, the locating device 200 may be a cellular telephone, a tablet, a laptop, or any other suitable device that is configured to communicate with other locating devices in proximity of the locating device 200. In one embodiment, the locating device 200 may be a special use electronic device. In exemplary embodiments, the locating device 200 is configured to communicate with other locating devices 200 that are within approximately twenty meters of the locating device 200.

In exemplary embodiments, the peer-to-peer ad hoc network system is used to monitor the presence of members of the group. In one example, the group is class of children that are on a field trip and the supervisor, or teacher, uses the system to make sure that the kids are always with the group even if he/she can not see them. In this example, each child has a locating device and the locating devices form the peer-to-peer ad hoc network. The locating devices are configured to communicate with each other and to detect when one of the members of the group is missing. In exemplary embodiments, the peer-to-peer ad hoc network may be configured to generate a notification that a member of the group is missing after no other member of the group has communicated with the missing member for a specified period of time, for example in one minute. If the peer-to-peer ad hoc network determines that a child is missing from the group, the supervisor is notified of the child's absence. In exemplary embodiments, the supervisor may be notified before the child himself finds separated from the group and starts panicking.

Figure 3:
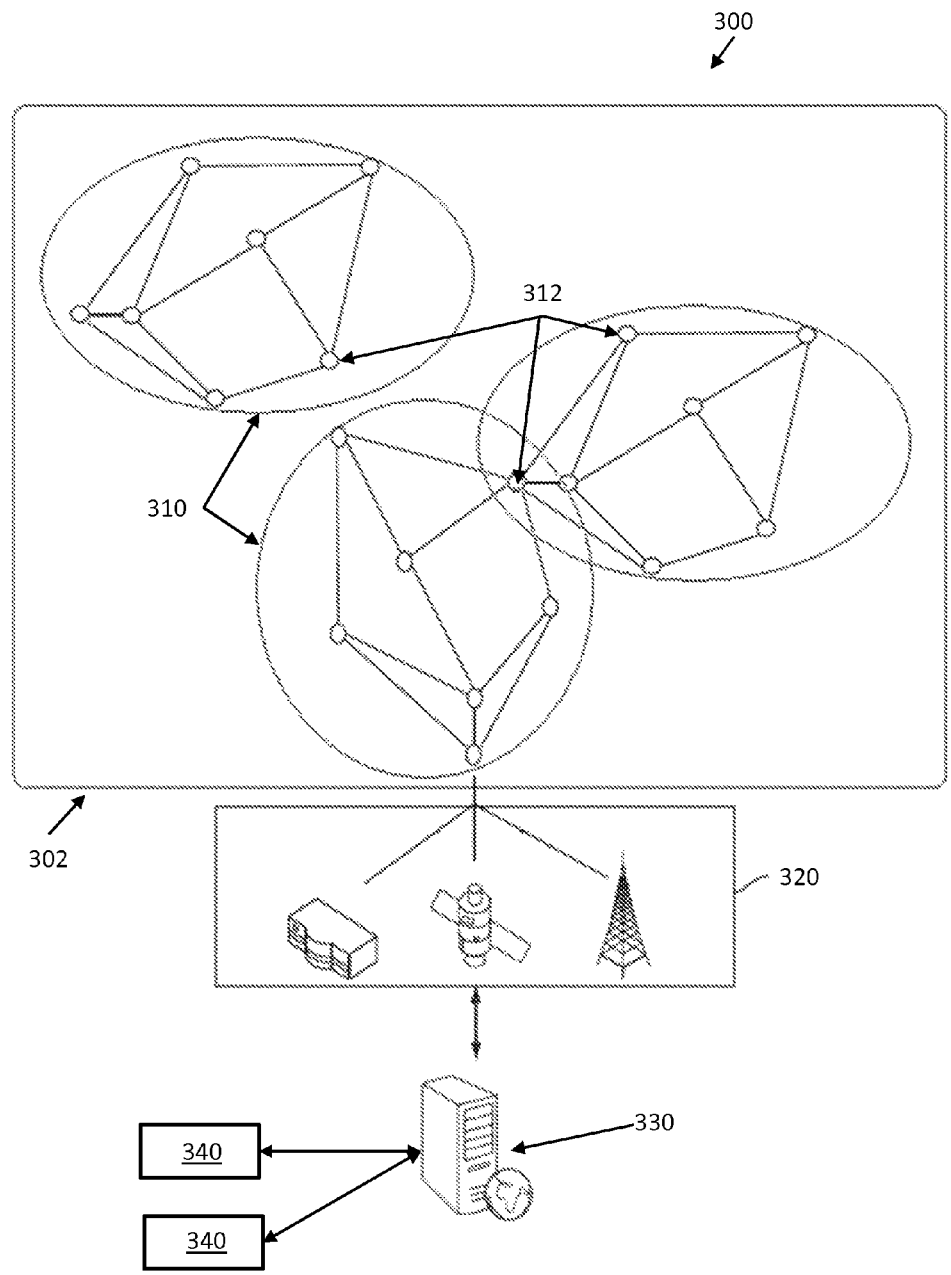
FIG. 3 is a schematic diagram of a peer-to-peer ad hoc network system for monitoring a presence of members of a group according to an exemplary embodiment.

Referring now to FIG. 3, a schematic diagram of a peer-to-peer ad hoc network system 300 for monitoring a presence of members of a group according to an exemplary embodiment is shown. As illustrated, the system 300 includes a plurality of groups 310 which each contain a plurality of members 312. In exemplary embodiments, the groups 310 may be part of a larger group 302. Each of the members 312 of the groups 310 are configured to communicate with one another and to determine when a member is missing from the group 310. In response to determining that a member 312 is missing from the group, one or more of the members 312 of the group 310 notifies the location server 330, via the communications network 320, of the absence of the member 312 of the group 310. Upon receiving the notification that a member 312 of the group 310 is missing, the location server 330 sends an alert to one or more supervisor devices 340 that corresponds to the missing member 312. As illustrated, a member can belong to several groups 310 at the same time. In addition, different groups 310 can have different over lapping time periods.

In one embodiment, each of the groups 310 corresponds to a group of students 312 participating in an after school activity and the larger group 302 corresponds the all of the students 312 at the school. It is common for students to participate in several after school activities. For example, a student might have basketball practice after school and then dramatics after basketball practice. The group for each of these activities are likely different, in that they contain many different students and different supervisors, or teachers. In exemplary embodiments, a parent or a guardian can use the system 300 to know if a student is with the right group of people at the right time.

In exemplary embodiments, the nature of the alert can depend on the nature of the groups and where the member 312 is expected to be at a certain time. For example, a child can be part of a larger group 302 having several sub-groups 310 that correspond to various after school activities. At the same time, the child can also belong to one of the sub-groups 310. In one embodiment, if a child is missing from the sub-groups 310 an alert may be sent to the supervisor in charge of the sub-group 310. However, if the child is missing from the larger group 302 an alert may be sent to the parent or guardian.

In exemplary embodiments, each person under supervision, or member 312, is designated with one or more supervisors and one or more modes of alert. In exemplary embodiments, the designated supervisor may be changed in over time. In the above example, a student may have a supervisor that is the coach of the basketball team during the time period of basketball practice and a drama teacher during the time period of dramatics practice. In addition, the student may have a supervisor that is their parent or guardian during both the time periods for basketball and dramatics practice.

In exemplary embodiments, the peer-to-peer network is configured to determine what members are located nearby. In one embodiment, determining what members are present in the group includes determining which members are within a designated region or area corresponding to the group. In exemplary embodiments, determining what members are present in the group includes defining a cluster of members that comprise a group. In one embodiment, it is not needed that all members of the group should always be all together. For example, in a museum tour or other activity children from a group may split up into smaller groups, or sub-groups. However, as long as every member of the group is with a sizeable number of other members in sub-groups, the members are considered to be safe and no alert is generated. In exemplary embodiments, all the members are checked for their vicinity from a designated group at a regular interval. If a member is found missing the supervisor is alerted using a preferred mode of alert.

In exemplary embodiments, the groups and sub-groups can be fixed, dynamic, or again ad hoc in nature. The vicinity can either be detected by any form of metric such as Linear, Euclidean or Infinity from the center of the cluster. The center can be determined by creating a convex perimeter such as convex hull or a circle around the group or sub-group.

Figure 4:
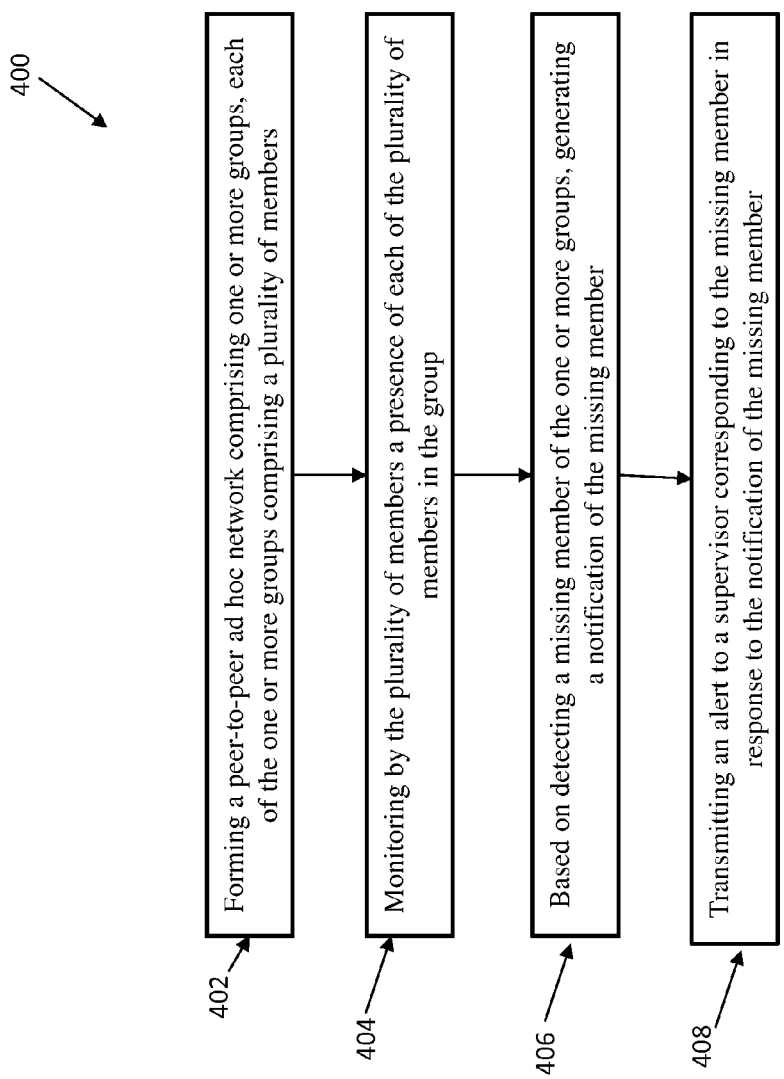
FIG. 4 is a flowchart diagram illustrating a method for monitoring a presence of a member of a group in a peer-to-peer ad hoc network in accordance with an exemplary embodiment.

Referring now to FIG. 4, a flowchart diagram illustrating a method 400 for monitoring the presence of a member in a peer-to-peer ad hoc network in accordance with an exemplary embodiment is shown. The method 400 includes forming a peer-to-peer ad hoc network comprising one or more groups, each of the one or more groups comprising a plurality of members, as shown at block 402. Next, as shown at block 404, the method 400 includes monitoring by the plurality of members a presence of each of the plurality of members in the group. Based on detecting a missing member of the one or more groups, the method 400 includes generating a notification of the missing member, as shown at block 406. As shown at block 408, the method 400 includes transmitting an alert to a supervisor corresponding to the missing member in response to the notification of the missing member.

In exemplary embodiments, the alert may include, but is not limited to, an identification of the missing member, a last known location of the missing member and a last time that the missing member communicated with another member of the one or more groups. In exemplary embodiments, the members may belong to more than one group at a time and the supervisor notified of the missing member may be based on the identification of the missing member and the group that the member is missing from.

As will be appreciated by those of ordinary skill in the art the peer-to-peer ad hoc network system disclosed herein may be used for a wide variety of applications. As discussed in the examples above, the system may be used for monitoring children's presence in a trusted group, such as an after school activity or on a bus. The system may also be used for individuals who need partial supervision but need to spend time independently, such as seniors or adults with some form of challenges such as autism where the supervisor might like to know that the person under supervision is among the right company. In addition, the peer-to-peer ad hoc network system disclosed herein may be used to monitor the presence of senior citizens or first responders in trusted groups. In yet another embodiment, the peer-to-peer ad hoc network system disclosed herein may be configured to monitor the presence of livestock in groups, where each of the livestock have a communications device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" or other high level programming language or other similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
    a peer-to-peer ad hoc network comprising a group having a plurality of members, each of the plurality of members comprising a locating device, wherein each of the plurality of members are configured to detect an absence of one of the plurality of members from the group;
    a location server configured to communicate with the locating device of at least one of the plurality of members; and
    a supervisor device configured to receive an alert from the location server, wherein the alert is generated by the location server in response to a detection of the absence of one of the plurality of members from the group and wherein the alert comprises a last time that the one of the plurality of members absent from the group communicated with another member of the group.

2. The system of claim 1, wherein the plurality of members detect the absence of one of the plurality of members from the group when none of the plurality of members have communicated with the one of the plurality of members during a predetermined time period.

3. The system of claim 1, wherein a member of the group is configured to communicate with each of the plurality of members of the group located within a distance of the member.

4. The system of claim 1, wherein the alert further comprises:
    an identification of the one of the plurality of members absent from the group; and
    a last known location of the one of the plurality of members absent from the group.

5. The system of claim 1, wherein the locating device comprises:
    an interface;
    a processing unit;
    a communications device; and
    a power supply.

6. The system of claim 1, wherein the interface is operable for configuring an operation of the locating device.

7. The system of claim 1, wherein the communications device is configured to communicate with the location server and with one or more members of the group.

* * * * *